Figure 1:
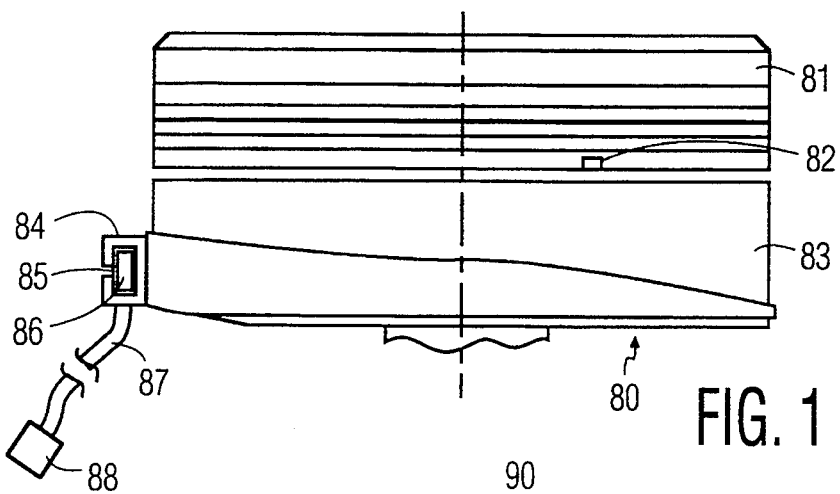

United States Patent [19]

Schandl et al.

[11] Patent Number: 5,388,015
[45] Date of Patent: Feb. 7, 1995

[54] MAGNETIC TAPE DEVICE WITH A HEAD CYLINDER

[75] Inventors: Hartmut Schandl, Vienna, Austria; Günter Gleim, Villingen-Schwennigen, Germany

[73] Assignee: Deutsche Thomson-Brandt GmbH, Villingen-Schwenningen, Germany

[21] Appl. No.: 161,073

[22] Filed: Dec. 3, 1993

Related U.S. Application Data

[63] Continuation of Ser. No. 750,052, Aug. 27, 1991, abandoned.

[30] Foreign Application Priority Data

Aug. 30, 1990 [DE] Germany ............... 4027416
Aug. 30, 1990 [DE] Germany ............... 4027417

[51] Int. Cl.[6] .................. G11B 15/18; G11B 5/027; G11B 5/10
[52] U.S. Cl. .................................. 360/69; 360/84; 360/128; 360/137
[58] Field of Search ................ 360/84, 33.1, 69, 95, 360/128, 137; 369/69; 318/138; 358/335, 906

[56] References Cited

U.S. PATENT DOCUMENTS

| | | | |
|---|---|---|---|
| 3,932,793 | 1/1976 | Müller | 318/138 |
| 3,964,100 | 6/1976 | Bennett et al. | 360/95 |
| 4,400,743 | 8/1983 | Takimoto et al. | 358/335 |
| 4,447,837 | 5/1984 | Hirata et al. | 369/69 |
| 4,796,114 | 1/1989 | Mori et al. | 360/84 |

FOREIGN PATENT DOCUMENTS 0320851 6/1989 European Pat. Off.

Primary Examiner—Timothy P. Callahan
Assistant Examiner—Trong Phan
Attorney, Agent, or Firm—Joseph S. Tripoli; Joseph J. Laks; Sammy S. Henig

[57] ABSTRACT

A system for heating a tape drive includes a heating element which is actuated by the same voltage that drives the motor. An electronic switch is responsive to the motor voltage and turns the heating element on when the motor is not running and off when the motor is running.

9 Claims, 3 Drawing Sheets

MAGNETIC TAPE DEVICE WITH A HEAD CYLINDER

This is a continuation of application Ser. No. 07/750,052, filed Aug. 27, 1991, now abandoned.

This invention is directed to a magnetic tape device for playing and recording signals using a rotatable head cylinder.

Head cylinders of commercially available magnetic tape devices, for example video recorders, include a drivable head wheel (upper drum) and a fixed lower section (lower drum). Magnetic heads are located around the circumference of the head wheel. During playback and recording the heads are brought into contact with a magnetic tape housed in a cassette. The cassette is arranged in a predetermined position on a drive chassis. The magnetic tape is drawn out from the cassette by means of threading elements and wound around a head cylinder by a rotating head wheel, which is driven by an electronically regulated motor. Typically, the head wheel is directly driven by the motor shaft. The drive motor typically is a brush-less, direct current (d.c.) motor having an electronic commutator circuit for the motor winding phases. Speed of rotation and phase position of the motor rotation are adjusted with constant motor operating voltage by means of a control voltage provided by a regulating circuit.

Ambient temperature changes can drop temperatures below the dew point and cause condensation in the magnetic tape drive. It is known that the higher the atmospheric humidity the higher the dew point temperature. The head cylinder is located on the drive of the magnetic tape device and is particularly susceptible to condensation formation because it produced from aluminum, which, has good thermal conductivity and thus facilitates the formation of condensation. Such condensation can, particularly upon initial start-up of the magnetic tape device, result in the magnetic tape adhering to the head cylinder and damaging either the magnetic tape, the magnetic heads, or both. Additionally, the condensation impairs the tape/head contact.

In some presently available video recorders the head cylinder is heated by a heating element located in the vicinity of the head cylinder to avoid the formation of condensation. The heating element frequently is a positive temperature-coefficient (PTC) resistor with a reference temperature of about 50°C., at which an increase in the resistance value begins. To keep the head cylinder free of condensation, and to disperse any existing condensation, which formed while the recorder was disconnected from a power supply, the heating element is switched on during a so-called "stand-by-mode", which is automatically initiated when the video recorder is connected to a power supply. This mode also corresponds to the off state of the recorder. The energy for the heating element is received from a voltage source which is located in the power supply of the recorder. However, the heating element is switched off during the recording and playback modes because the magnetic tape winding around the head cylinder and the rotation of the head wheel prevent dew forming on the head cylinder. An electronic switch which serves this purpose is controlled by a circuit which communicates with the operating section of the recorder. The heating element is normally mounted on the circumference of the stationary lower section of the head cylinder by means of a metal clip. The transfer of the heat generated by the heating element occurs primarily through thermal conduction to the lower section of the head cylinder, and then by convection to the rotatable head wheel. "It may be desirable to reduce the expenditure for the heating arrangement of the head cylinder."

The heating element, for heating the head cylinder, is located in the vicinity of the motor, preferably in the stator of the motor. The stator of a direct current motor contains a predetermined number of winding turns which can be electronically commutated. The winding turns are formed into coils which are regularly arranged on ring-shaped stator laminations comprised of layers of iron plates. The stator is arranged on an axle housing which is formed in the head cylinder lower section and which extends into the motor space. The motor shaft is rotatably supported inside the axle housing and a portion of the motor shaft projects from one end of the axle housing and is firmly coupled with the head wheel to support magnetic heads within the head cylinder. Another portion of the motor shaft projects from the other end of the axle housing and is coupled to the rotor of the motor. The winding turns are electrically connected to a section of a printed circuit board arranged within the motor. A portion of the printed circuit board is located outside the motor and supports sensors for obtaining signals as a controlled variable for the motor regulation. These sensors also provide commutation control signals for the commutation sequence of the motor coils. The outside location portion of the printed circuit board additionally supports connections for a motor regulating circuit and for inputting of operating voltages. A predetermined number of field magnets are arranged around the rotor. The coils are placed opposite the motor coils and are separated from them by an air gap. In order to generate a rotating magnetic field which provides the turning torque, the motor coils are supplied with a cyclic current. This is accomplished by means of the commutation control signals and an electronic commutation circuit which is part of the motor regulating circuit and which can be an integrated circuit. The commutation circuit switches on the coils which have a favorable torque building position with respect to the field magnets rotating with the rotor. With a constant motor operating voltage, the current through the respective winding turns is determined by a regulating voltage generated in the motor regulating circuit.

The heating element is preferably fitted into the stator and, for the purpose of energy supply, is electrically connected to the printed circuit board. Accordingly, the heating element requires no additional mounting means. The heat generated by the heating element is mainly transmitted to the head cylinder via the stator and the axle housing which extends into the motor space. Heat from the heating element is efficiently transmitted to the head cylinder because there is a direct transfer of heat from the heating element to the head cylinder. In the presently existing arrangement the heating element is mounted on the lower section of the head cylinder and direct heat transfer is virtually excluded. The invention therefore saves electrical energy.

An additional saving in the heating of the head cylinder is realized because the motor operating voltage is utilized as the energy supply for the heating element. The supply is not burdened by the motor operating modes, such as "stand-by" and "stop" modes, and permits the relatively large start-up current for the heating PTC resistor to be produced. As mentioned above, in the recording and playback modes, the heating element is switched off and the voltage source is not loaded by the heating element. The motor regulating circuit is utilized to control an electronic switch which switches the heating element on and off. The motor can be associated with a sensor consisting of a light-emitting diode and a photo-electric cell for receiving the commutation control signals and the controlled variables for the motor regulation. A switching voltage can be used to switch the light-emitting diode on to activate the sensor. The switching voltage can be obtained, for example, from the motor regulating circuit. When the motor is not rotating the sensor is turned off because the service life of such sensor is primarily dependent upon the operation time of the light-emitting diode.

The use of the motor operating voltage and the motor regulating circuit to control the heating element results in the ability to simplify the power supply and control circuitry. Also, because the heating element and electronic switch are mounted on the printed circuit board, costly connecting lines are eliminated. Additionally, the heating element and the electronic switch can be automatically assembled onto the printed circuit board.

Figure 2A:
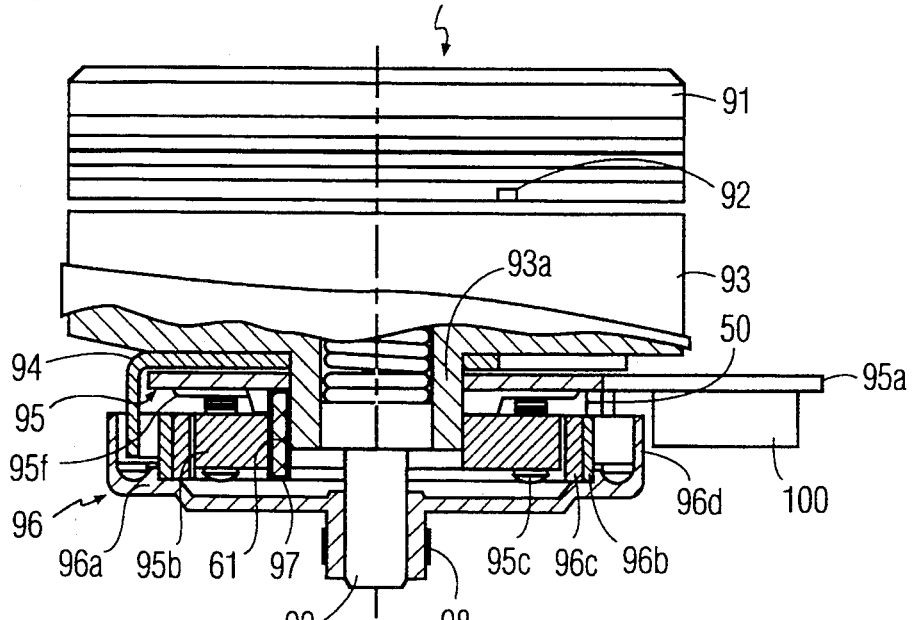
Figure 2B:
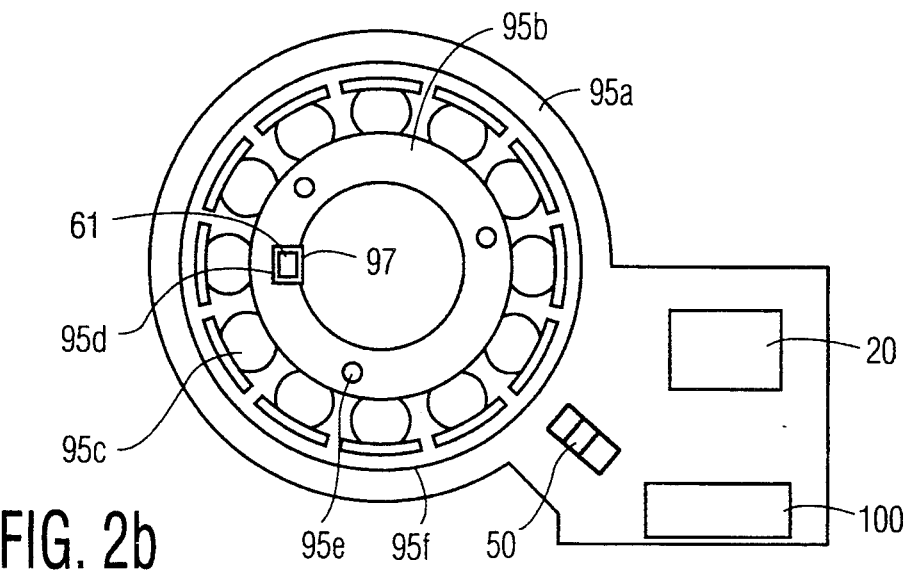
Figure 3A:
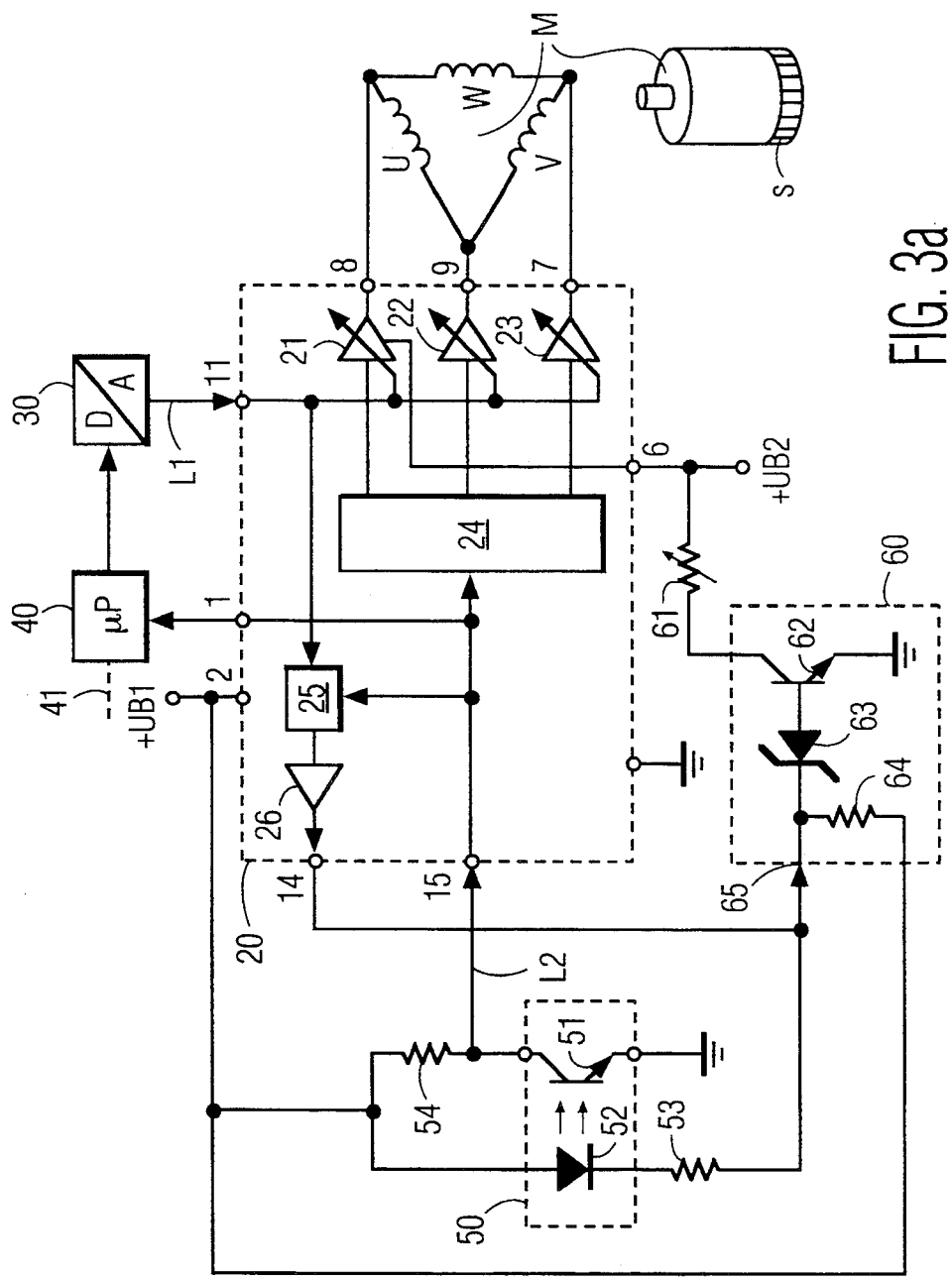
Figure 3B:
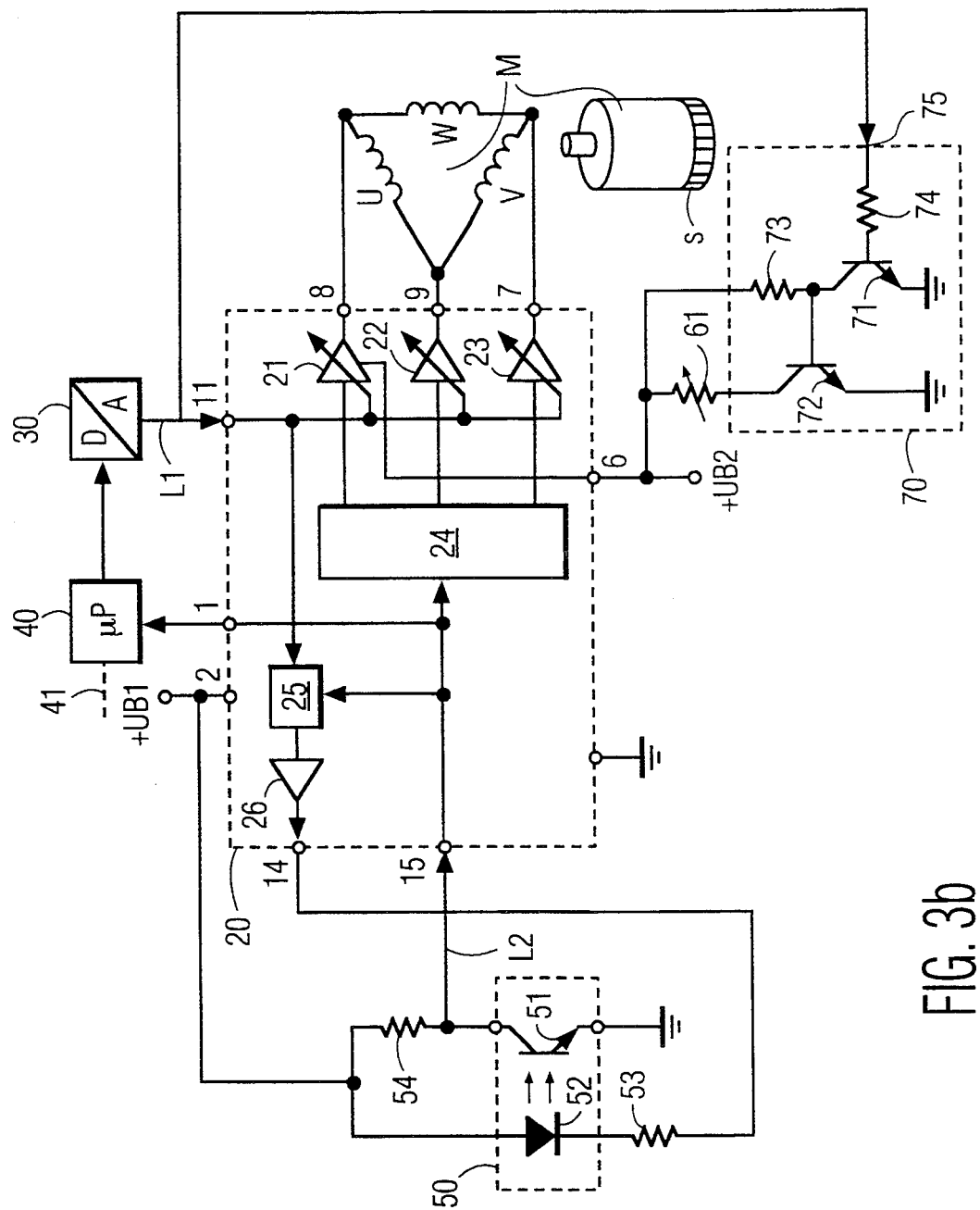

In the FIGURES:

FIG. 1 is a front view of a prior art head cylinder for a VHS video recorder,

FIG. 2a is a front view, partially broken away, of a brush-less direct current motor and a heating element in accordance with the invention, FIG. 2b is a cross section of the embodiment of FIG. 2a, FIG. 3a is a preferred embodiment of a regulating circuit, including an electronic switch for the heating element, FIG. 3b is another preferred embodiment of an electronic switch for the heating element.

In FIG. 1, a prior art head cylinder 80 includes a heating element 86. The head cylinder 80 consists of a rotatable head wheel 81, which supports magnetic heads 82, and a stationary head cylinder 83. The heating element 86 is mounted on the stationary head cylinder 83. The heating element 86 is a positive temperature coefficient (PTC) resistor, which is sheathed in an electrically insulating hose 85 and fixed to the head cylinder 83 by a metal clip 84. A connecting cable 87 has a plug-type connector 88 and connects the heating element 86 to the power supply.

FIG. 2a shows a head cylinder 90 in combination with a brush-less direct current (dc) motor. A heating element 61, which can be a PTC resistor is mounted in stator 95 of the dc motor. The head cylinder 90 includes a rotatable head wheel 91, which supports magnetic heads 92, and a stationary head cylinder 93. The heating element 61 is encased in an electrically insulating layer 97.

FIG. 2b shows a printed circuit board 95a which includes a stator 95, consisting of iron laminations and having coils 95c around portions of the stator. A recess 95d receives the heating element 61, which is supported on a plastic-type spacer 95f. A portion of the motor regulating circuit shown in FIG. 3a and FIG. 3b, an electronic switch, also shown in FIG. 3a and FIG. 3b, and a plug-type connector 100 are also arranged on the circuit board 95a.

The stator 95 and the motor housing 94 are affixed to the stationary head cylinder 93 by screws (not shown) which pass through the holes 95e. The stator bundle 95b holds the heating element 61 with a form-fit and, the heating element contacts an axle housing 93a, which is formed in the lower section of the head cylinder 93 and extends into the motor space. A motor shaft 99 is rotatably supported on bearings inside the axle housing 93a. A portion of the motor shaft 99 projects upwardly out of the axle housing 93a and is firmly coupled to the head wheel 91, which supports the magnetic heads 92. The part of the motor shaft 99 which projects downwardly out of the axle housing 93a is firmly coupled to the rotor 96. The rotor 96 includes a cup-shaped part 96a and supports field magnets 96c which are surrounded by a soft iron ring 96b. The field magnets 96c are located opposite to the coils 95c and are separated therefrom by an air gap.

The rotor 96 is fixed to the motor shaft 99 by means of a split washer 98. The cup-shaped part 96a is made from a transparent plastic material. Opaque line markings are provided on the perimeter 96d of the cup-shaped part 96a which moves in the slot between the sides of a slotted photo-electric optical sensor 50. Sensor 50 may be of the type photo coupled interrupter module CNY 36 or 37 of Telefunken. One side of the sensor 50 supports a light emitting diode (LED) and the other side supports a photosensitive element, such as a phototransistor. As the motor rotates pulses are generated by the opaque lines passing between the LED and phototransistor. The sequence of the pulses is used to derive the control signals and the controlled variables for regulation of the motor speed of rotation and phase position. The optical sensor 50 is arranged in a fixed position relative to the coils 95c on the circuit board 95a.

The coils 95c, which are connected in sets of four to form each of the windings U, V, W shown in FIG. 3a and FIG. 3b, the sensor 50 and an integrated motor circuit (e.g. U2560B/Telefunken) 20 form the part of the motor regulating circuit, which part is located on the printed circuit board 95a. The electrical connections of the motor, the motor regulating circuit and the power supply are effected by a connecting cable having a plug-type connector 100.

FIG. 3a shows the motor regulating circuit in combination with the heating element 61 and an electronic switch 60. The windings U, V, W of the motor M are energized and controlled by the integrated motor circuit (U2560B/Telefunken) 20, optical switch 50 and a microprocessor $\mu$P (e.g. ZC93147P/Motorola) 40, and a digital-to-analog converter 30. The $\mu$P 40 is connected to an operating section of the device via a data-bus line 41. The motor regulating circuit can be activated via the $\mu$P 40. The $\mu$P 40 operates as the regulator unit during the regulating operation. The windings U, V, W, which are interconnected in a delta connection, are connected to end stages 21 through 23 of the integrated motor circuit 20. The end stages 21 through 23 are controllable amplifiers, each of which has two input terminals. One input terminal of each amplifier is connected to an output terminal of a first switching device 24 of the integrated motor circuit 20. The second input terminals are connected to an input terminal 11 of the integrated motor circuit 20. The input terminal 11 is connected to the output terminal of the digital-to-analog converter circuit 30 via a line L1. The output terminals of the end stages 21 through 23 are connected to the windings U, V, W via motor circuit terminals 7 through 9. The first switching device 24 controls the end stages 21 through 23 to provide the commutation sequence of the windings U, V, W.

The sensor 50 includes a phototransistor 51 and an LED 52. The anode of LED 52 receives a constant positive operating voltage +UB1 from terminal 2 of the motor circuit 20. Terminal 2 is also connected to a resistor 54 which is connected to the first switching device 24 and a second switching device 25. A switching amplifier 26 is connected to the output terminal of second switching device 25. The output terminal 14 of the motor circuit 20 is coupled with the control input 65 of the electronic switch 60 and also via a protective resistor 53, to the cathode of LED 52. The emitter of transistor 51 is connected to a reference potential, such as ground. The collector of phototransistor 51 provides the output signal of optical switch 50. The collector of phototransistor 51 is connected to an input terminal 15 of the integrated motor circuit 20 via a line L2 and is also connected with the positive operating voltage +UB1 via the load resistor 54.

The electronic switch 60 includes an NPN transistor 62, a breakdown diode 63 and a resistor 64. The anode of breakdown diode 63 is connected to the base of transistor 62. The cathode of diode 63 serves as the control input 65 of the electronic switch 60. The resistor 64 is wired between control input terminal 65 and the positive operating voltage +UB1. The collector-to-emitter path of transistor 62, the emitter of which is connected to ground, and the heating element 61 form a series connection which is wired between ground and a constant positive motor operating voltage +UB2. The positive motor operating voltage +UB2 is fed via an input terminal 6 of the intergrated motor circuit to the end stages 21 through 23.

The breakdown diode 63 is designed such that the voltage difference between the positive operating voltage +UB1 and the sum of the breakdown voltage (Uz) of breakdown diode 63 and the forward voltage (UBE) of the base-to-emitter path of transistor 62 is less than the conducting-state voltage VLED of LED 52, e.g. UB1−(Uz+UBE)<VLED. Accordingly, when the switching amplifier 26 is off, the LED 52 is off and transistor 62 conducts, and the current flowing into the base of transistor 62 has a drop in voltage at resistor 64 corresponding to the aforementioned voltage difference. When the switching amplifier 26 is on the LED 52 also is on and the transistor 62 is off.

The motor regulating circuit and the electronic switch 60 work together. To switch LED 52 on and off both lines L1, L2 are sensed by the second switching device 25. If neither of the two lines L1, L2 carries a signal the switching device 25 blocks the switching amplifier 26, or rather the resistance of its output resistor becomes so great that no supply current (forward current) for the LED 52 can be supplied via terminal 14 of the motor circuit 20. This causes an increase in voltage at output terminal 14 of the motor circuit 20 to a potential which causes a current flow into the base of transistor 62. Therefore, transistor 62 becomes conducting and the heating element 61 is switched on. Accordingly, the control current is primarily determined by the resistor 64. When a signal is present on either one or both of lines L1, L2 the switching device 25 turns the switching amplifier 26 on and causes LED 52 to conduct. The drop in potential (switching voltage) which is generated between terminals 2 and 14 effects the blocking of transistor 62 and heating element 61 is switched off.

Signals are generated on lines L1, L2 as follows: upon initiation of either the recording or playback mode, μP 40 outputs a digital start signal. The start signal is converted into an analog start signal in the digital-to-analog converter 30 and is fed via the line L1 to the inputs of the end stages 21 through 23 and also to a first input of the second switching device 25. The analog start signal therefore starts motor M and also turns LED 52 on. When the motor M rotates pulses are generated as the markings S on the rotor perimeter move between the LED 52 and photosensor 51. The pulses are fed via the signal line L2 to the second input terminal of the second switching device 25 and to one input terminal of the first switching device 24 and, via terminal 1 of the motor circuit 20, to a data incur terminal of μP 40. These signals are evaluated by both the μP 40 and the two switching devices 24, 25. The μP 40 uses the sequence of these signals to provide the controlled variable for regulating the motor. Also, the switching device 24 receives control signals which switch, in cyclic fashion, the end stages 21 through 23 for the commutation sequence of the winding strands U, V, W. The μP 40 compares the regulating variable with a predetermined command variable and provides a pulse-width modulated (PWM) signal. The PWM signal contains the information which determines the torque to be used in driving the rotor of motor M. The PWM signal is converted into an analog regulating voltage by the digital-to-analog converter 30 and provided by line L1 to the input terminals of the end stages 21 through 23 and also to one input terminal of the second switching device 25.

Upon the completion of the play mode, the μP 40 stops providing signals to the D/A 30 and the output from the D/A 30 returns to its equilibrium rest potential. The end stages 21 through 23 and turned off and the motor M stops.

FIG. 3b shows the motor regulating circuit described in FIG. 3a in conjunction with the heating element 61 and an electronic switch 70, the control input 75 of which receives the regulating voltage. The electronic switch 70 includes a first NPN transistor 71, a second NPN transistor 72 and resistors 73 and 74. The emitters of the two transistors 71, 72 are connected to ground. The collector-to-emitter path of the second transistor 72 and the heating element 61 form a series connection which is wired between ground and the positive motor operating voltage +UB2. The collector of the first transistor 71 is connected to the base of the second transistor 72. The resistor 73 is wired between the collector of the first transistor 71 and the positive motor operating voltage +UB2, this resistor is the load resistor for the first transistor 71. The base of the first transistor 71 is coupled to the signal line L1 via the resistor 74. The regulating voltage, and the analog start signal are both greater than the conducting-state voltage (UBE) of the base-to-emitter path of the first transistor 71. The regulating voltage and the analog start signal, therefore, turn transistor 71 on. Transistor 72 is then off and the heating element 61 is also off. The equilibrium rest potential of D/A 30 is less than the conducting-state voltage (UBE) of the base-emitter link of transistor 71. Therefore, the equilibrium rest potential turns off transistor 71, transistor 72 is turned on and, the heating element 61 is also on.

Either one of the two controllable electronic switches 60 and 70 shown in FIGS. 3a and 3b can be incorporated into an integrated circuit, for example, such as the motor circuit U2560B/Telefunken. The invention is also suitable for the heating of the head cylinder of camcorders and DAT recorders.

I claim:

1. A system for heating and controlling a tape drive device having a rotatable head cylinder driven by a controllable motor, said system comprising:
   a motor control circuit for generating a motor control signal that is coupled to said motor to control said motor such that said control signal selectively causes said motor to stop and to run;
   a heating element for heating said drive device; and
   switch means responsive to said motor control signal for turning said heating element on when said motor is stopped and off when said motor is running in accordance with said motor control signal.

2. The system of claim 1 wherein said motor includes a stator and said heating element is arranged in said stator.

3. The system of claim 2 further including means for providing the same voltage to said motor and to said heating device.

4. The system of claim 3 wherein said switch means includes a solid state switching device in association with said heating element.

5. The system of claim 4 wherein said means for providing pulses includes a light emitting diode and a photosensitive element.

6. The system of claim 5 wherein said heating element is a positive temperature coefficient resistor.

7. The system of claim 1 wherein said switch means includes a solid state switching device in association with said heating element.

8. The system of claim 7 wherein said heating element is a positive temperature coefficient resistor.

9. The system of claim 8 wherein said means for providing pulses includes a light emitting diode and a photosensitive element.

* * * * *